W. F. COCHRAN.
PLOW.
APPLICATION FILED JULY 16, 1919.

1,346,701. Patented July 13, 1920.

Inventor
W. F. Cochran

UNITED STATES PATENT OFFICE.

WILLARD F. COCHRAN, OF BLUE RIDGE, GEORGIA.

PLOW.

1,346,701.        Specification of Letters Patent.     Patented July 13, 1920.

Application filed July 16, 1919. Serial No. 311,252.

*To all whom it may concern:*

Be it known that I, WILLARD F. COCHRAN, a citizen of the United States, residing at Blue Ridge, in the county of Fannin and State of Georgia, have invented certain new and useful Improvements in Plows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in garden plows and cultivators and consists of a simple and efficient device of this character, so arranged that a number of different forms of cultivators or plows may be used without the necessity of tools to remove and replace different forms of plows or cultivators.

The invention consists of further various details of construction, combination and arrangement of parts which will be hereinafter fully described, shown in the accompanying drawings and then specifically defined in the appended claim.

Figure 1:
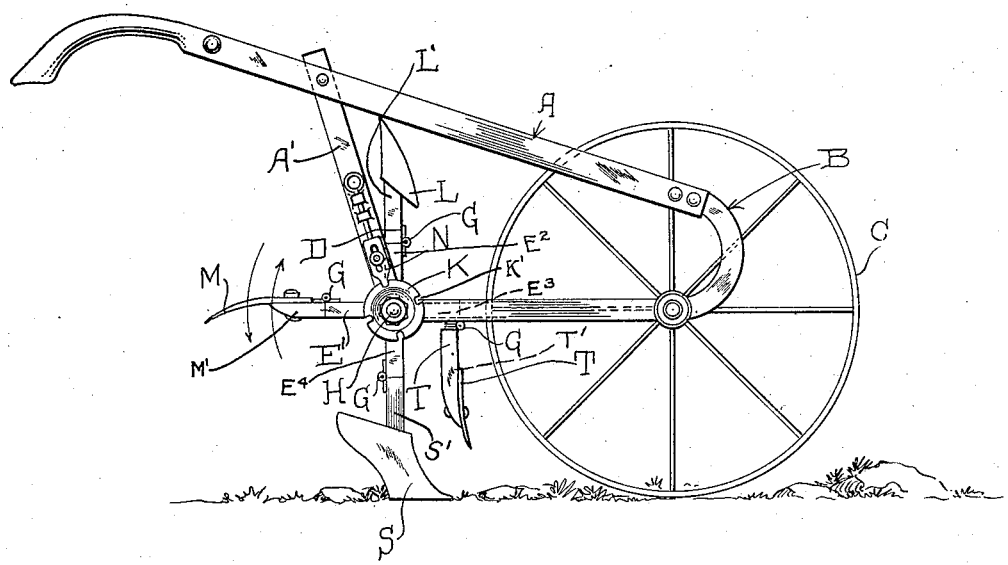
Figure 2:
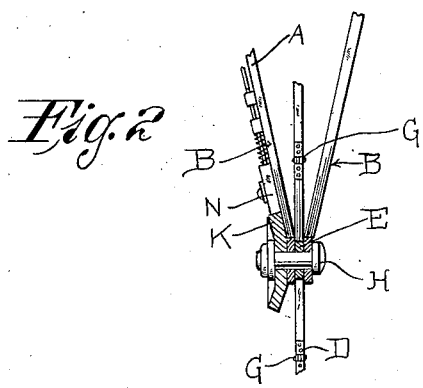

My invention is illustrated in the accompanying drawings which, with the letters of reference marked thereon, form a part of this application, and in which:

Figure 1 is a side elevation showing my device applied to the frame of a garden plow, and Fig. 2 is an enlarged sectional view through the device.

Reference now being had to the details of the drawings by letter:

A designates the handles of an ordinary garden plow having a suitable frame B in which a wheel C is journaled and of the usual construction in this type of apparatus. A member E is journaled upon the shaft H and is provided with integral radial arms $E'$, $E^2$, $E^3$, and $E^4$ disposed at right angles to each other and to the end of the arm $E'$. The shank portion $M'$ of the plow is hinged as at G, and to the end of the arm $E^2$ a similar shank $L'$ of the plow L is hinged. To the end of the arm $E^3$ the shank portion $T'$ of a plow T is hinged, while to the end of the arm $E^4$ the shank portion $S'$ of a plow S is hinged as at G. A disk K fixed to the shaft, is provided with notches in its circumference, adapted to be engaged by the pawl N fastened to the bar $A'$ of the frame.

In operation, when it is desired to use one type of plow or cultivator, the bars are swung upon their pivots in order to bring the particular adjustment desired.

By the provision of the form shown in the drawing any one of the four plows or cultivators may be easily and quickly swung to a position for operation without the necessity of tools to detach the plows of different forms when it is desired to convert the apparatus for various uses.

What I claim to be new is:

A garden plow comprising a frame, a shaft journaled therein, a member journaled upon said shaft and having radial arms, plows with shank portions hinged to the ends of said arms, a notched disk fixed to said shaft, and a pawl mounted upon the frame adapted to engage one of said notches.

In testimony whereof I hereunto affix my signature.

WILLARD F. COCHRAN.